United States Patent [19]

Miller

[11] Patent Number: 5,196,704
[45] Date of Patent: Mar. 23, 1993

[54] ENVIRONMENTAL RADIATION DETECTION VIA THERMOLUMINESCENCE

[75] Inventor: Steven D. Miller, Richland, Wash.

[73] Assignee: Battelle Memorial Institute, Richland, Wash.

[21] Appl. No.: 766,685

[22] Filed: Sep. 27, 1991

[51] Int. Cl.$^5$ .............................................. G01T 1/115
[52] U.S. Cl. ................................... 250/337; 350/484.1
[58] Field of Search ........................ 250/337, 484.1 A

[56] References Cited

U.S. PATENT DOCUMENTS 4,303,857  12/1981  Inoue et al. .......................... 250/328
4,506,157  3/1985   Keller ............................. 250/484.1 A
4,954,707  9/1990   Miller et al. ......................... 250/337

Primary Examiner—Constantine Hannaher
Assistant Examiner—Richard Hanig
Attorney, Agent, or Firm—Paul W. Zimmerman

[57] ABSTRACT

The method and apparatus of the present invention relate to cryogenically cooling a thermoluminescent material, exposing it to a low level of radiation (less than about 1 R) while it is at the cooled temperature, warming the thermoluminescent material to "room temperature", and counting the photons emitted during heating. Sufficient sensitivity is achieved without exposing the thermoluminescent material to ultraviolet light thereby simplifying the measurements.

20 Claims, 2 Drawing Sheets

ENVIRONMENTAL RADIATION DETECTION VIA THERMOLUMINESCENCE

This invention was made with Government support under Contract DE-AC06-76RLO 1830 awarded by the U.S. Department of Energy. The Government has certain rights in the invention.

FIELD OF THE INVENTION

The present invention relates generally to a method and apparatus for detection of environmental ionizing radiation or more specifically to thermoluminescent detection of environmental ionizing radiation relying solely upon thermal excitation of a thermoluminescent material.

BACKGROUND OF THE INVENTION

Detection of radiation by the general process of exposing a thermoluminescent material to radiation then observing visible light emitted as the material is heated is well known. Exposing the thermoluminescent material to ultraviolet light prior to heating the thermoluminescent material is known to enhance the amount of visible light emitted. Medlin, U.S Pat. No. 3,388,252 uses this procedure to obtain a glow curve for quartziferous materials. Moran et al., U.S. Pat. No. 3,835,329 measures fast neutron flux by incorporating this procedure, and Miller et al., U.S. Pat. No. 4,954,707 uses it to "read" dosimeters using thermoluminescent material.

The thermoluminescent materials used in measuring radiation are crystalline compounds containing impurities or structural imperfections such as missing atoms or ions and mismatch between planes of the crystal lattices. Some of these imperfections are "traps" having the ability to capture or "trap" electrons and/or holes in excited states generated by exposure to ionizing radiation such as neutron, gamma and beta radiation. When trapped electrons are released, luminescence occurs. Release of electrons occurs upon heating the crystalline compound to a temperature that stimulates a trap to release electrons.

The purpose of the ultraviolet light exposure is to either load the traps with electrons or convert high temperature traps to low temperature traps in order to increase the amount of luminescence.

Conventional thermoluminescent dosimetry relies upon heating to high temperatures to stimulate traps to release electrons. At these high temperatures, radiation heat transfer or incandescence limits the sensitivity of the method. Other thermoluminescent dosimetry procedures including cryogenically cooled thermoluminescent dosimetry rely on exposing the thermoluminescent material to ultraviolet light to further stimulate the traps. Although the sensitivity is improved by using ultraviolet exposure compared to not using ultraviolet exposure, sensitivity is still limited to about 2.6 microcoulombs/Kg. Moreover, the addition of ultraviolet exposure adds to the complexity and expense of making the measurements. In all cases, the thermoluminescent material is exposed to radiation at about "room temperature" then heated to elevated temperatures or cooled to cryogenic temperatures and subsequently heated to obtain a reading.

Research identifying low temperature traps has been reported, for example, by VK Jain and MS Jahan *Changes in the spectrum of Thermally Stimulated Emission From CaF$_2$:Mn at Low Temperatures*, Phys. Stat. Sol. (b) 131, K161 (1985), and by R. Alcala et al. *Manganese Centers in Low temperature X-Irradiated CaF$_2$:Mn*, Phys. Stat. Sol. (b) 98, 315 (1980). Jain and Jahan irradiated calcium fluoride manganese with X-rays to a total dose of about 1.0 Mrad at a temperature of about and 83 K. to obtain a glow curve and emission spectrum. Alcala et al. irradiated calcium fluoride manganese with X-rays of 40 kV and 20 mA at a temperature of about.15 K. and 80 K. to observe differences in emission spectra.

Thermoluminescent dosimetry methods have not been widely used for environmental monitoring in the past because they have not had sufficient sensitivity to accurately measure environmental levels of radiation which may be as low as from about 5 microrad/hr to about 10 microrad/hr. In addition, thermoluminescent measurements prior to the present invention required laboratory analysis.

Environmental radiation detection is currently performed using large ionization chambers. The chambers are filled with a gas that becomes ionized upon exposure to ionizing radiation. Sensitivity to low exposures of ionizing radiation is obtained by providing a large active volume of gas. The ionization chambers provide real time information of the level of ionizing radiation. However, ionization chambers are too large and heavy to be used as a hand-held radiation detector.

It would be beneficial to exploit the small size and low weight advantages of cryogenic thermoluminescent radiation detection for environmental radiation detection without sacrificing sensitivity.

SUMMARY OF THE INVENTION

The present invention is directed toward a method and apparatus for environmental radiation detection of ionizing radiation, neutron, gamma, and charged particles.

The method of radiation detection comprises the steps of cooling a thermoluminescent material to a temperature from 0.0 K. to 250 K., exposing the material to radiation while cooled, heating the material at a rate to allow thermoluminescence and measuring the photons emitted by thermoluminescence.

The apparatus for radiation detection comprises the elements of a thermoluminescent material (usually a metallic halide such as commercially available calcium fluoride or lithium fluoride), a means for transferring heat to or from the thermoluminescent material, a means for counting photons emitted by thermoluminescence after exposure to ionizing radiation, and a light tight case containing the thermoluminescent material, means for cooling, and means for counting photons.

It is surprising that sufficient sensitivity is achieved without exposing the thermoluminescent material to ultraviolet light, thereby simplifying the measurements.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
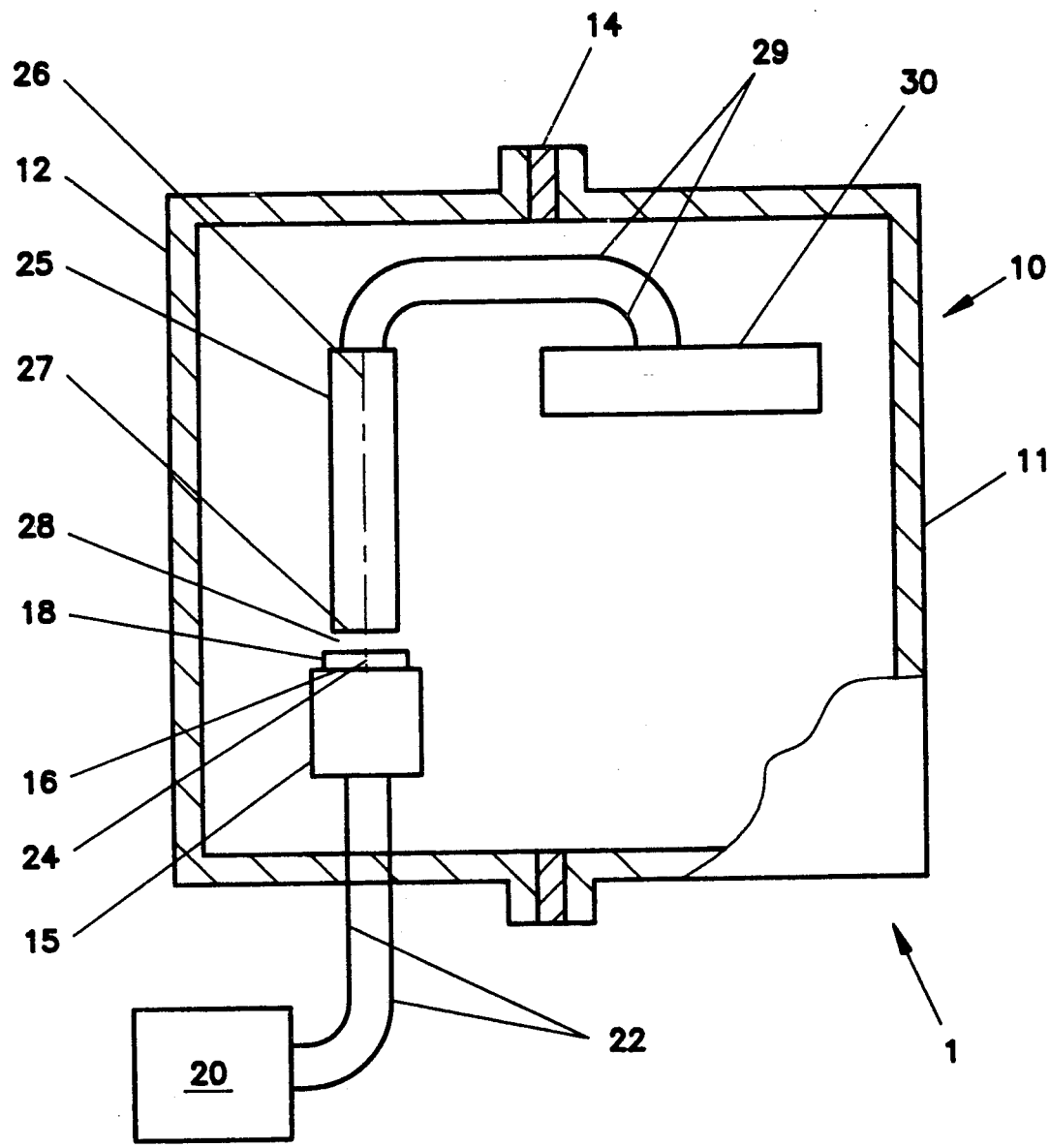
FIG. 1 is a schematic sectional view of a radiation detection apparatus of the present invention.

FIG. 1 illustrates in schematic form the necessary elements of the inventive radiation detection apparatus (1). The case (10) is formed in two halves, a housing (11) and an endcap (12). The housing (11) may be of any material opaque to light. The endcap must be opaque to light but transparent to the ionizing radiation to be measured. Opacity to light, especially visible light is of utmost importance to achieve sensitivities on the order of 0.2 nano-rad. An elastomeric seal (14) between the housing (11) and the endcap (12) prevent light from entering through the interface of the housing (11) and endcap (12).

Within the case (10) may be provided a heat transfer means (15). In environments that are above cryogenic temperatures including but not limited to interior areas such as laboratories, and exterior areas such as radioactive waste sites, the heat transfer means (15) is a cooling means preferably a peltier or sterling cryocooler wherein the heat transfer surface (16) is a flat surface upon which a thermoluminescent material (18) is mounted. Electric power to operate a peltier or sterling cryocooler may be provided by a source (20) including but not limited to a battery pack or other electricity source that may be within the case (10) or separate from the case (10). Electric power from the source (20) is transferred via wires (22) to the heat transfer means (15). Alternatively, cooling may be accomplished with dry ice or other source of cooling.

In environments that are near cryogenic temperatures including but not limited to exterior areas such as portions of outer space, and interior areas such as cryogenic chambers, the cooling means is not necessary since the environment is already cold. Thus, in a cryogenically cooled environment, the heat transfer means (15) is a heating means that may be, for example, solar, nuclear, chemical, electrical or mechanical heating means.

The thermoluminescent material (18) is preferably commercial grade LiF or $CaF_2$. Other thermoluminescent materials including but not limited to $AlO_3$, $CaSO_4$, and $CaSO_4$ doped with metallic elements including but not limited to Mn, Mg, Ti, Ag, Ce, Pb, and Dy may be used as well. It is preferred that the thermoluminescent material be shaped in the form of a disk having a diameter and longitudinal axis (24). It is also preferred to place heat conductive grease, for example Dow Corning 340 Silicon Heat Sink Compound, between the thermoluminescent material (18) and the cooled surface (16). Furthermore, the thermoluminescent material (18) is preferably mounted to allow for differential thermal expansion between the cooled surface (16) and the thermoluminescent material (18).

Also within the case (10) is a means for counting photons. The preferred means for counting photons is a photomultiplier tube PMT (25) having a longitudinal axis (26). The PMT (25) is matched to the thermoluminescent material (18) in size and wavelength, and is mounted so that the longitudinal axis (26) of the PMT (25) is parallel to and substantially aligned with the longitudinal axis (24) of the thermoluminescent material. The diameter of the PMT (25) should be close to the diameter of the thermoluminescent material (18), and the wavelengths of light that the thermoluminescent material (18) emits should be close to the spectrum that the PMT (25) detects. In addition, the PMT (25) should have a low dark current and high quantum efficiency to achieve sensitivity to low level ionizing radiation. By way of example, the PMT (25) may be an RCA 8575 with a thermoluminescent material (18) about 2 cm in diameter.

The PMT (25) is mounted with the light gathering end (27) in close proximity to the thermoluminescent material (18), but leaving a gap (28) between the thermoluminescent material (18) and the PMT (25). The gap (28) must be sufficient to prevent conductive thermal contact between the PMT (25) and the thermoluminescent material (18) to minimize the thermal load. The gap (28) must be sufficiently small to minimize the amount of thermoluminescent emissions escaping into the case (10). The gap (28) is preferably between 0.15 cm and 0.64 cm. Gaps smaller than 0.15 cm or larger than 0.64 cm may be used. The preferred gap size is one that is easy to achieve in practice that provides sufficient sensitivity of measurements.

Figure 2:
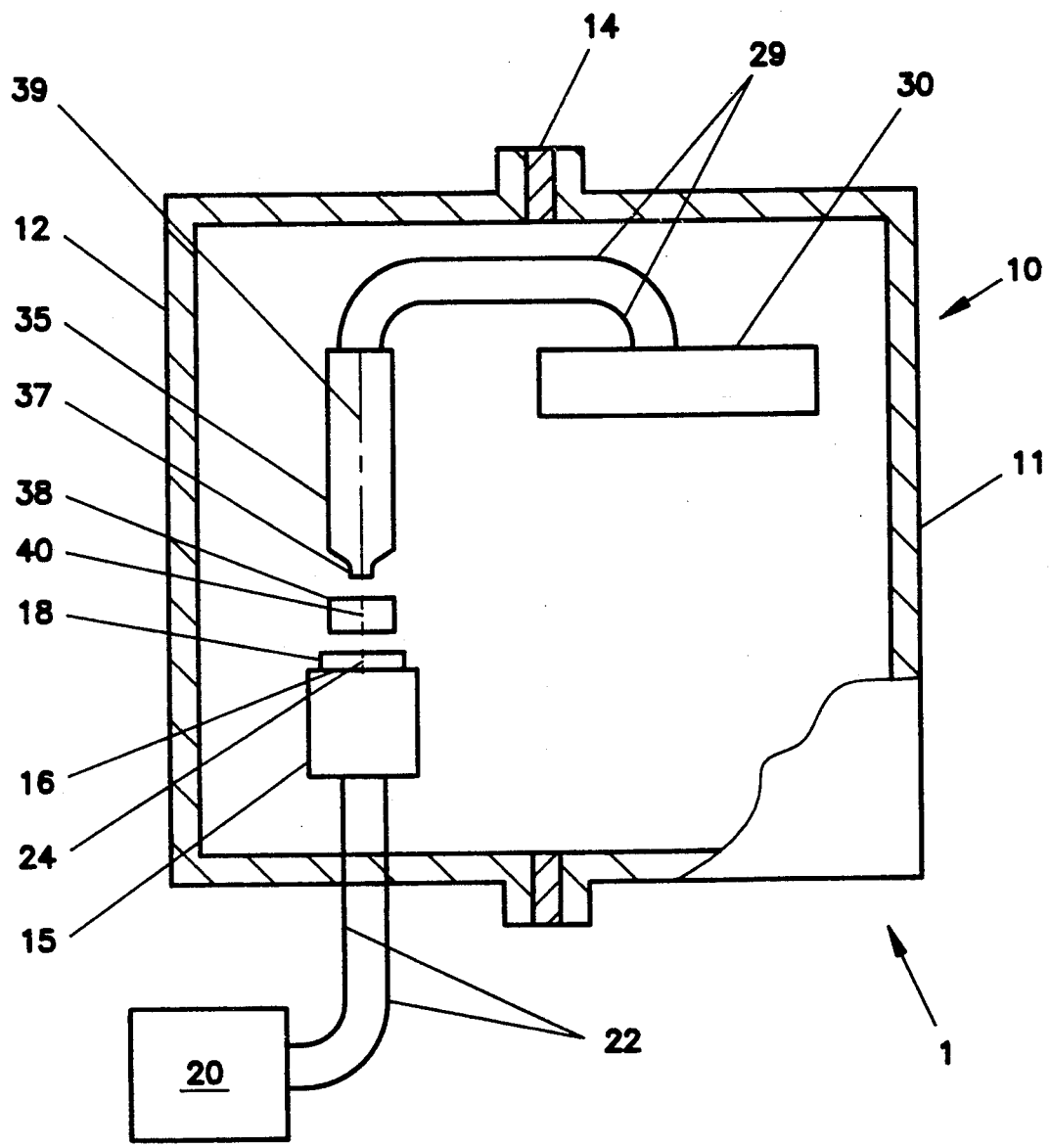
FIG. 2 is a schematic sectional view of a second embodiment of a radiation detection apparatus of the present invention.

Another means for counting photons is an avalanche photodiode detector (35) shown in FIG. 2. The diameter of the light gathering end (37) of an avalanche photodiode detector (35) is as small as 1 cm. Hence, to obtain sufficient optical signal, a light focusing means (38) is placed between the thermoluminescent material (18) and the avalanche photodiode detector (35).

The avalanche photodiode detector (35) is mounted with its longitudinal axis (39) substantially aligned with the longitudinal axis (40) of the light focusing means (38) and substantially aligned with the longitudinal axis (24) of the thermoluminescent material (18).

The light focusing means (38) may be a single element, including but not limited to standard optical lenses or conical internally reflective lenses. Alternatively, the light focusing means (38) may comprise a plurality of elements including, but not limited to fiber optic tapered bundles, or multiple standard lenses.

The means for counting photons, whether a PMT (25), an avalanche photodiode (35) or other means converts the light energy from photons emitted by the thermoluminescent material (18) to an electrical signal which is conveyed via wires (29) to an electronic receiver (30).

The electronic receiver (30) may be a visual display of the counts from the means for counting photons from which readings are taken and recorded manually. The electronic receiver (30) may be a small computer capable of recording the photon counts and computing the desired result.

The radiation detection apparatus (1) described herein is used to obtain radiation detection measurements in the following manner. The thermoluminescent material (18) within the radiation detection apparatus (1) is cooled to cryogenic temperatures of between 0.0 K. and 270 K., preferably in the range of about 100 K. below the excitation temperature of most of the thermoluminescent traps. Achieving cooling well below the excitation temperature of the thermoluminescent traps stabilizes the traps. Liquid nitrogen temperatures of about 80 K., are sufficient to achieve a temperature about 100 K. below the excitation temperature of the thermoluminescent traps. After cooling, the radiation detection apparatus (1) is exposed to ionizing radiation as low as less than about 1 R while the thermoluminescent material (18) is maintained at the low temperature.

Exposure time depends upon the type of radiation and the intensity of its source. After exposure to ionizing radiation, the thermoluminescent material (18) is heated to a temperature about 100 K. above the thermoluminescent traps. In a warm environment, heating may be accomplished by terminating cooling and allowing the thermoluminescent material to come to equilibrium with the environment, or by active heating. In a cryogenic environment, heating may be accomplished with a heating means. As the thermoluminescent material (18) is heated, the traps between the lowest temperature prior to exposure and the higher temperature emit photons which are received by the means for counting photons.

The signal from the means for counting photons is analyzed by mathematically integrating the signal as a function of time. Analysis may be carried out manually or with a computer.

EXAMPLE 1

An experiment was performed in accordance with the procedures provided in U.S. Pat. No. 4,954,707 issued Sep. 4, 1990, column 2, line 61 to column 4, line 3 hereby incorporated by reference. The experiment produced the data shown in FIG. 3 of the patent showing a sensitivity range of from about 2.6 microcoulombs/Kg (10 mR) to 260 microcoulombs/Kg (1000 mR).

EXAMPLE 2

A second experiment was performed using commercially available calcium fluoride as the thermoluminescent material in accordance with the method of the present invention. A sample of calcium fluoride was cooled using a heat transfer means of liquid nitrogen to a temperature of about 80 K. and maintained at that temperature while irradiated with a gamma source to a dose of 0.5 mR.

The cooled irradiated material was set on a thin piece of plastic to retard heating and allowed to warm to room temperature. As the material warmed to room temperature, photons were emitted and counted with a photomultiplier tube.

The data collected from this experiment may be used to calculate the minimum detectable amount of gamma radiation for the present invention. The minimum detectable amount (MDA) is $$MDA = S(4B)(1/SF)(1/CGF)$$

where
Sensitivity Factor (S) = 5.0(10-5) mR/count
Background (B) = 2.24 counts
Size Factor (SF) = 200.
Counting Geometry Factor (CGF) = 10.
Performing this calculation results in a minimum detectable amount of 0.2 nanoR. This minimum detectable amount is less than the minimum detectable amount for an ionization chamber (0.1 microR) and is well below the sensitivity of any other thermoluminescent dosimetry process.

An environmental ionizing radiation detector using thermoluminescent material has been shown and described that has sensitivity equivalent to ionization chambers. The advantages of light weight, and low cost offset the disadvantage of obtaining readings near real time.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for radiation detection, comprising:
   (a) a thermoluminescent material having a longitudinal axis,
   (b) a means for counting photons emitted by the termoluminescent material, said means having a longitudinal axis oriented parallel to and substantially aligned with the longitudinal axis of the thermoluminescent material,
   (c) a cooling means to cool the thermoluminescent material below the excitation temperature of most traps, and
   (d) a light tight case containing the thermoluminescent material, the cooling means, and the means for counting photons.

2. An apparatus as recited in claim 1, wherein the thermoluminescent material is a metallic halide.

3. An apparatus as recited in claim 2, wherein the metallic halide is selected from the group of lithium fluoride and sodium fluoride.

4. An apparatus as recited in claim 1, wherein the heat transfer means is a cryocooler.

5. An apparatus as recited in claim 1, wherein the means for counting photons is a photomultiplier tube.

6. An apparatus as recited in claim 5, wherein the the thermoluminescent material has a diameter that is closely matched to the diameter of the photomultiplier tube.

7. An apparatus as recited in claim 5, wherein a light gathering end of the photomultiplier tube is spaced from the thermoluminescent material forming a gap.

8. An apparatus as recited in claim 7, wherein the gap is from about 0.15 cm to about 0.64 cm.

9. An apparatus as recited in claim wherein the means for counting photons is an avalanche photodiode detector.

10. An apparatus as recited in claim 9, further comprising:
    a light focusing means placed between the thermoluminescent material and the avalanche photodiode detector for focusing light from the thermoluminescent material into a small light gathering end of the avalanche photodiode detector.

11. An apparatus as recited in claim 10, wherein the light focusing means is selected from the group consisting of standard optical lenses and tapered fiber optic bundles.

12. A method for radiation detection, comprising:
    (a) shaping a thermoluminescent material into a disc having a diameter and a longitudinal axis,
    (b) providing a means for counting photons emitted by the thermoluminescent material, said means having a longitudinal axis oriented parallel to and aligned with the longitudinal axis of the thermoluminescent material,
    (c) cooling the thermoluminescent material below the excitation temperature of most traps,
    (d) exposing the thermoluminescent material to ionizing radiation, (e) heating the thermoluminescent material after exposure to ionizing radiation to a temperature above the excitation temperature of most traps, and
(f) counting the photons emitted from the traps upon heating.

13. A method as recited in claim 12, wherein the thermoluminescent material is a metallic halide.

14. A method as recited in claim 13, wherein the metallic halide is selected from the group of lithium fluoride and sodium fluoride.

15. A method as recited in claim 12, wherein the thermoluminescent material is cooled to 100 K. below the excitation temperature of most traps.

16. A method as recited in claim 12, wherein counting photons is done with a photomultiplier tube.

17. A method as recited in claim 16, further comprising:
    matching the diameter of the thermoluminescent material to the diameter of the photomultiplier tube.

18. A method as recited in claim 12 wherein the ionizing radiation is less than 1 R.

19. A method as recited in claim 13, wherein counting photons is done with an avalanche photodiode.

20. A method for radiation detection comprising:
    (a) shaping a thermoluminescent material into a shape having a longitudinal axis,
    (b) providing a means for counting photons emitted by the thermoluminescent material, said means having a longitudinal axis oriented to and substantially aligned with the longitudinal axis of the thermoluminescent material,
    (c) cooling the thermoluminescent material below the excitation temperature of most traps,
    (d) exposing the termoluminescent material to ionizing radiation,
    (e) heating the thermoluminescent material after exposure to ionizing radiation to a temperature above the excitation temperature of most traps, and
    (f) counting the photons emitted from the traps upon heating.

* * * * *